(12) United States Patent
Matsui et al.

(10) Patent No.: US 8,413,995 B2
(45) Date of Patent: Apr. 9, 2013

(54) OIL SEAL (75) Inventors: Hiroki Matsui, Fukushima (JP);
Masayuki Tanida, Fukushima (JP);
Hirotaka Mizuta, Fujisawa (JP);
Hideyuki Furuyama, Fukushima (JP);
Ken Yoshikawa, Fukushima (JP); Yuki Sato, Fujisawa (JP)

(73) Assignee: NOK Corporation (JP)

( * ) Notice: Subject to any disclaimer, the term of this patent is extended or adjusted under 35 U.S.C. 154(b) by 0 days.

(21) Appl. No.: 12/595,417

(22) PCT Filed: Feb. 22, 2008

(86) PCT No.: PCT/JP2008/053025
§ 371 (c)(1),
(2), (4) Date: Oct. 9, 2009

(87) PCT Pub. No.: WO2008/126478
PCT Pub. Date: Oct. 23, 2008

(65) Prior Publication Data
US 2010/0109252 A1 May 6, 2010

(30) Foreign Application Priority Data

Apr. 11, 2007 (JP) ................................. 2007-103436

(51) Int. Cl.
*F16J 15/32* (2006.01)
(52) U.S. Cl.
USPC ........................................................ 277/559
(58) Field of Classification Search .................... 277/559
See application file for complete search history.

(56) References Cited

U.S. PATENT DOCUMENTS

| 3,930,655 | A | * | 1/1976 | Fern | 277/559 |
| 3,973,781 | A | * | 8/1976 | Grorich | 277/559 |
| 4,288,083 | A | * | 9/1981 | Braconier | 277/559 |
| 5,759,466 | A | * | 6/1998 | Onuma et al. | 264/161 |
| 6,276,691 | B1 | | 8/2001 | Nishigaki et al. | |
| 6,726,211 | B1 | * | 4/2004 | Kuroki et al. | 277/353 |
| 6,729,624 | B1 | * | 5/2004 | Johnston | 277/560 |
| 2007/0182104 | A1 | * | 8/2007 | Matsui | 277/559 |

FOREIGN PATENT DOCUMENTS

| EP | 0939257 A2 | 9/1999 |
| EP | 1698809 A1 | 9/2006 |
| JP | H03-29768 U | 3/1991 |
| JP | H06-56568 U | 8/1994 |
| JP | H08-159294-AA | 6/1996 |
| JP | H08-178082 A | 7/1996 |

(Continued)

*Primary Examiner* — Vishal Patel
(74) *Attorney, Agent, or Firm* — Harness, Dickey & Pierce, P.L.C.

(57) ABSTRACT

For an oil seal (1) having a seal lip (6) with a slope (7) at the side of sealed fluid and a slope (8) at the side opposite to the sealed fluid, and a screw section (9) provided on the slope (8) for pushing back sealed fluid by a pumping effect at a time of rotation, in order to achieve low torque characteristics based on fluid lubrication by increasing the thickness of an oil film on sliding surfaces, an intermediate surface (10) is provided between the slopes (7, 8), and an oppositely threaded screw section (11) for sucking the sealed fluid by a pumping effect is provided on the intermediate surface (10) without reaching the boundary (13) between the intermediate surface (10) and the slope (8), so that a threadless region is provided in the entire circumference between the screw section (11) and the boundary (13).

6 Claims, 4 Drawing Sheets

FOREIGN PATENT DOCUMENTS

| | | |
|---|---|---|
| JP | H11-311338 A | 11/1999 |
| JP | 2002-22027 A | 1/2002 |
| JP | 2003-254439 A | 9/2003 |
| JP | 2005-172061 A | 6/2005 |
| WO | WO-2005-057058 A1 | 6/2005 |
| WO | WO 2005057058 A1 * | 6/2005 |

* cited by examiner

OIL SEAL

CROSS-REFERENCE TO RELATED APPLICATIONS

This is a national phase of International Application No. PCT/JP2008/053025 filed on Feb. 22, 2008 and published in Japanese language.

BACKGROUND OF THE INVENTION

1. Field of the Invention

The present invention relates to an oil seal which is a kind of a sealing device. For example, the oil seal of the present invention is used in a field relating to an automobile or in a field of a general purpose machine and the like.

2. Description of the Conventional Art

An oil seal is generally required to have low torque characteristics so as to suppress sliding abrasion of a seal lip. In order to obtain low torque characteristics, a technique for reducing fastening force by reducing a cross section of a seal lip or the like, and a technique for reducing a friction coefficient by change of a material, modification of a surface (for example, coating of a fluorine resin) and the like have been discussed. However, in order to realize more excellent low torque characteristics, it is considered to realize low torque characteristics based on fluid lubrication by increasing the thickness of an oil film on a sliding surface.

Figure 6:
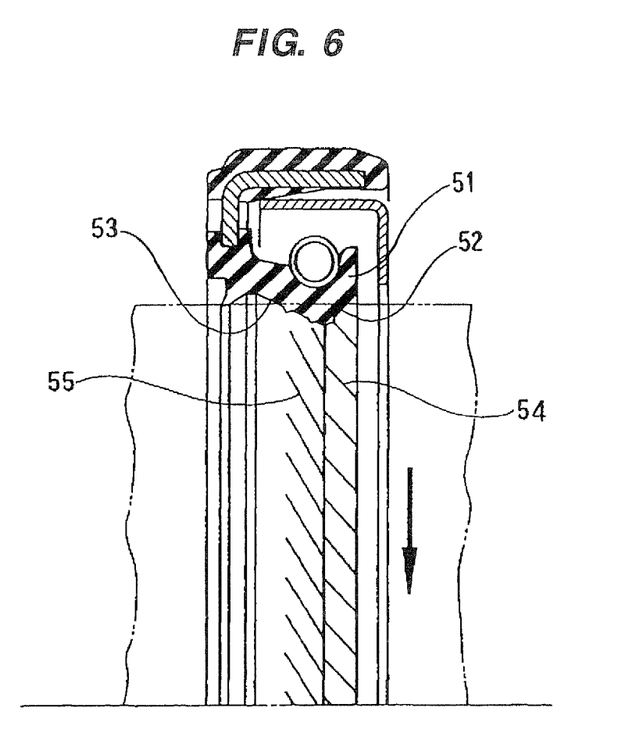
FIG. 6 is a sectional view of main part of an oil seal according to a conventional embodiment.

FIG. 6 illustrates a conventional technique developed. In this technique, screw sections 54 and 55 are provided on a slope 52 at the side of sealed fluid and a slope 53 at the side opposite to the sealed fluid of a seal lip 51 respectively, and a pumping effect induced by the screw sections 54 and 55 pushes back the sealed fluid toward the side of the sealed fluid (refer to Japanese Utility Model Application Laid-Open No. 3-29768).

According to this technique, since the pumping effect induced by screw sections 54 and 55 pushes back the sealed fluid toward the side of the sealed fluid, sealing property increases. However, since the thickness of the oil film on the sliding surface necessarily decreases, low torque characteristics based on fluid lubrication can not be realized.

Further, Japanese Patent Application Laid-Open No. 2003-254439 describes a technique, in which an intermediate surface is provided between a slope at the side of sealed fluid and a slope at the side opposite to the sealed fluid. However, this prior art is not to provide a reverse screw section on the intermediate surface.

SUMMARY OF THE INVENTION

Problems to be Solved by the Invention

The present invention is to solve the aforementioned problems, and aims to obtain an oil seal having low torque characteristics based on fluid lubrication by increasing the thickness of an oil film on a sliding surface.

Means for Solving the Problem

In order to achieve the objective, an oil seal according to a first aspect of the present invention has a seal lip in slidably close contact with a circumferential surface of a mating member such as a shaft, a slope at the side of sealed fluid and a slope at the side opposite to the sealed fluid both of which are provided on the seal lip, and a screw section provided on the slope at the side opposite to the sealed fluid to perform a function of pushing back sealed fluid by a pumping effect induced at a time of rotation, wherein an intermediate surface is provided between a slope at the side of the sealed fluid and a slope at the side opposite to the sealed fluid, and an oppositely threaded screw section for performing a function of sucking the sealed fluid by a pumping effect induced at a time of rotation is provided on the intermediate surface. The oppositely threaded screw section provided on the intermediate surface is provided in such a way that the oppositely threaded screw section does not reach a boundary between the intermediate surface and the slope at the side opposite to the sealed fluid, so that a threadless region lying in the entire circumference between the screw section and the boundary and being in close contact with the circumferential surface of the mating member is provided.

Furthermore, according to a fourth aspect of the oil seal of the present invention, in the oil seals described in the first aspect, the intermediate surface is formed to have a sloping surface having an angle at the side of the sealed fluid in a mounted state.

Effect of the Invention

The oil seal of the present invention having the aforementioned configuration has an intermediate surface between the slope at the side of the sealed fluid and the slope at the side opposite to the sealed fluid of the seal lip, and the intermediate surface has a predetermined axial direction width and is in close contact with the circumferential surface of the mating member. Thus, the seal lip can stably contact the mating member with suppressed sliding abrasion. Further, an oppositely threaded screw section (which will be also called "a reverse screw section" below) is provided on the intermediate surface and performs a function of sucking the sealed fluid by a pumping effect induced at a time of rotation. Thus, the sealed fluid is positively introduced to the intermediate surface by the pumping effect induced by the reverse screw section, dynamic pressure is generated on the intermediate surface, and the thickness of the oil film thus increases. The intermediate surface is parallel to a center axial line of the oil seal, or has a smaller sloping angle with respect to the center axial line of the oil seal than those of the slope at the side of the sealed fluid and the slope at the side opposite to the sealed fluid. Therefore, according to this oil seal, since a portion having the thick oil film lies in a wide region, the oil seal can have low torque characteristics based on fluid lubrication which is the objective of the present invention. Further, since the pumping effect induced by the screw section (which will be called also "a normal screw section" below) provided on the slope at the side opposite to the sealed fluid pushes back the sealed fluid introduced to the intermediate surface, the sealed fluid does not leak toward the side opposite to the sealed fluid.

Further, since a threadless region lies at the side opposite to the sealed fluid of the reverse screw section on the intermediate surface, so-called static leakage can be prevented.

In addition, as described above, the intermediate surface is parallel to a center axial line of the oil seal, or has a smaller sloping angle with respect to the center axial line of the oil seal than those of the slope at the side of the sealed fluid and the slope at the side opposite to the sealed fluid. Then, the present invention includes the following three embodiments in a mounted state. That is, the present invention includes: (1) an embodiment in which the intermediate surface is parallel to the center axial line of the oil seal; (2) an embodiment in which the intermediate surface is formed to have a sloping surface having an angle at the side opposite to the sealed fluid;

and (3) an embodiment in which the intermediate surface is formed to have a sloping surface having an angle at the side of the sealed fluid.

In particular, the embodiment in (3) among those has the following specific effectiveness.

In the embodiment in (3), since the intermediate surface is formed to have the sloping surface having an angle at the side of the sealed fluid, the seal lip slides on a line between the slope at the side opposite to the sealed fluid and the intermediate surface. On the other hand, this line is a portion where the sealed fluid is gathered most due to the pumping effect induced by the normal screw section provided on the slope at the side opposite to the sealed fluid and due to the pumping effect induced by the reverse screw section provided on the intermediate surface. Therefore, since the seal lip slides on the portion where the sealed fluid is gathered most, the thickness of the oil film in the embodiment in (3) increases more than the thickness of the oil film in the embodiment in (1) or (2), and more excellent low torque characteristics can be thus realized.

Therefore, in the fourth aspect, since the intermediate surface is formed to have a sloping surface having an angle at the side of the sealed fluid, the aforementioned effectiveness can be obtained.

DETAILED DESCRIPTION OF PREFERRED EMBODIMENT

The present invention includes the following embodiments.

Relating to the first aspect:

(1) The low torque characteristics are realized by making a lip to have a geometric shape and increasing a thickness of an oil film.

(2) In order to increase the thickness of an oil film on a lip sliding surface and hold a sealing property, a lip shape is made such that an oppositely threaded screw, for example, is provided on a flat section (an intermediate surface) having a flat lip shape, and a conventional screw is provided on a section at the atmosphere side (a slope at the side opposite to sealed fluid).

(3) Dynamic pressure on the sliding surface is generated by making the sealed fluid to freely leak by the reverse screw section, and the thickness of the oil film thus increases. Thus, the low torque characteristics can be expected.

(4) A contact width of the reverse screw section expands by making the lip shape to be a flat shape, and a thick portion of the oil film on the sliding surface can also expand.

(5) In order to prevent the total leakage at the lip, pumping force (discharge force) of the screw provided on the section at the atmosphere side is set to be larger than pumping force (suction force) of the reverse screw provided on the flat section.

(6) The thickness of the oil film on the sliding surface is increased by providing the reverse screw section on the flat lip portion, and the low torque characteristics can be realized. However, when the screw section penetrates the entire sliding width, the static leakage could occur. Consequently, the screw section stops at a middle of the sliding width, and the static leakage is thus prevented. Furthermore, a non-penetrating region does not come to be at the same portion with respect to the sliding width, both an effect for increasing the oil film and an effect for preventing the static leakage can be obtained.

Relating to the fourth aspect:

(7) Conventionally, the intermediate surface has an angle at the atmosphere side (the side opposite to sealed fluid), and the seal lip slides on a line between the intermediate surface and the oil side surface (the slope at the side of sealed fluid). Therefore, an effect induced by the screw appears almost only at the atmosphere side, and the oil film on the sliding section is thin. Thus, there is a fault that the torque is high.

(8) Consequently, the intermediate surface is provided between the oil side surface (the slope at the side of sealed fluid) and the atmosphere side surface (the slope at the side opposite to the sealed fluid) and has an angle (being more than 0 degree to 25 degrees or less, preferably 0.1 degrees or more to 20 degrees or less) at the oil side in a mounted state. Further, a reverse screw is provided on this intermediate surface.

(9) The lip slides between the atmosphere side surface (the slope at the side opposite to the sealed fluid) having a normal screw and the intermediate surface having a reverse screw. Oil (sealed fluid) is gathered in a sliding line by an effect induced by the normal screw at the atmosphere side and the reverse screw on the intermediate surface. Thus, the thickness of the oil film on the sliding section increases, and torque comes to be low. The sealing property can be held by the pumping effect induced by the normal screw at the atmosphere side, and both the sealing property and the low torque can be thus obtained.

(10) The intermediate surface is provided between the oil side surface (the slope at the side of sealed fluid) and the atmosphere side surface (the slope at the side opposite to the sealed fluid) and has an angle (being more than 0 degree to 25 degrees or less, preferably 0.1 degrees or more to 20 degrees or less) at the oil side in a mounted state. The normal screw is provided on the atmosphere side surface, and the reverse screw is provided on the intermediate surface. A type of the screw does not matter (for example, the normal screw has a ship bottom shape, and the reverse screw has a parallel shape). The lip slides on a line between the atmosphere side surface having the normal screw and the intermediate surface having the reverse screw. Oil (sealed fluid) is gathered on a sliding line by an effect induced by the normal screw at the atmosphere side and the reverse screw on the intermediate surface. Thus, the thickness of the oil film on the sliding section increases, and low torque is obtained. The sealing property can be held by the pumping effect induced by the normal screw at the atmosphere side, and both the sealing property and the low torque can be thus obtained. Furthermore, because of low torque, heat generation by sliding is low. Because of thick oil film, the oil seal has low abrasion, and thus has a long life.

Example

Examples of the present invention will be described below with reference to the drawings.

Figure 1:
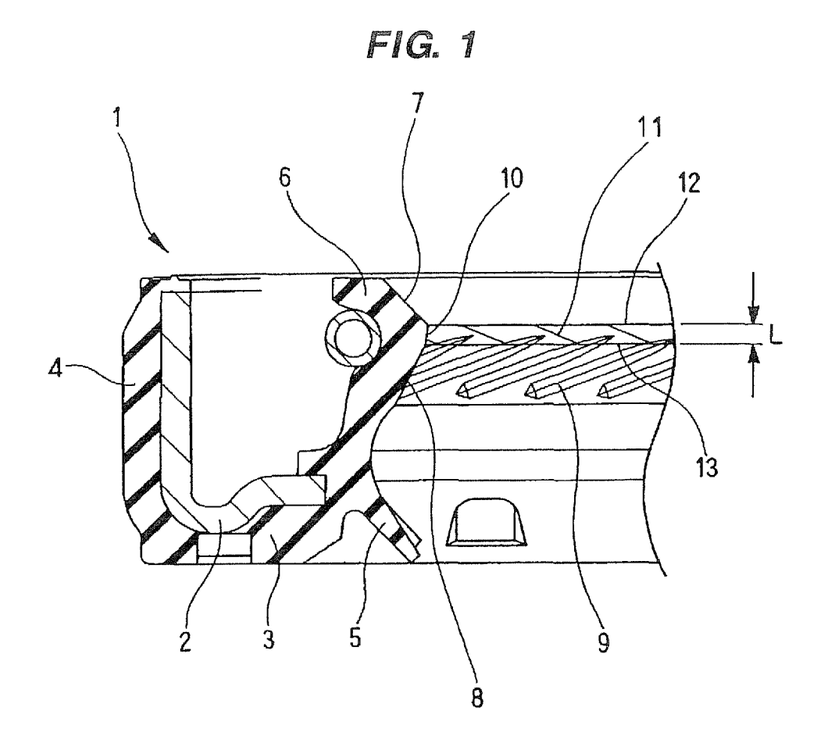
FIG. 1 is a sectional view of main part of an oil seal according to an embodiment of the present invention.

FIG. 1 illustrates a section of main part of an oil seal 1 according to the example of the present invention. The oil seal 1 according to the examples has a following configuration.

The oil seal 1 has an outer circumferential seal section 4 and a dust lip 5 which are provided with a rubber-like elastic body 3 bonded (vulcanized and bonded) to a metal ring 2. In addition, the oil seal 1 has a seal lip 6 in slidably close contact with the circumferential surface of a shaft (a mating member, not illustrated). The seal lip 6 has a slope 7 at the side of sealed fluid and a slope 8 at the side opposite to the sealed fluid which are provided on a top end sliding section of the seal lip 6. The latter, i.e. the slope 8 at the side opposite to the sealed fluid, has a screw section (normal screw section) 9 for performing a function of pushing back the sealed fluid by a pumping effect induced at a time of by rotation. The normal screw section 9 consists of a plurality of spiral protrusions provided on the circumferential surface and having a ship bottom shape specifically in this figure. The height of a screw thread is about 180 to 240 μm in actual dimension.

Further, a cylindrical intermediate surface (flat surface) 10 is provided between the slope 7 at the side of sealed fluid and the slope 8 at the side opposite to the sealed fluid, and is in surface contact with the circumferential surface of the shaft along a predetermined axial direction width L. An oppositely threaded screw section (reverse screw section) 11 is provided on the intermediate surface 10, and performs a function of sucking the sealed fluid by a pumping effect induced at time of rotation. The reverse screw section 11 consists of a plurality of spiral protrusions provided on the circumferential surface. In this figure, since the thicknesses of the protrusions are thin, the protrusion is illustrated with one line. The height of a screw thread is about 20 to 35 μm in actual dimension. The axial direction width L of the intermediate surface 10 is about 0.5 mm (0.1 to 1.0 mm) in actual dimension.

As for a direction of spiral, the screw section 9 is set in the direction which inclines frontward in the axis rotation direction (refer to an arrow in FIG. 2) from an end section at the side opposite to the sealed fluid to an end section at the side of the sealed fluid, and, to the contrary, the reverse screw section 11 is set in the direction which inclines backward in the axis rotation direction from the end section at the side opposite to the sealed fluid to the end section at the side of the sealed fluid.

In the oil seal 1 having the aforementioned configuration, the intermediate surface 10 in surface contact with the circumferential surface of the shaft along the predetermined axial direction width L is provided between the slope 7 at the side of the sealed fluid and the slope 8 at the side opposite to the sealed fluid of the seal lip 6. Thus, the seal lip 6 stably contacts the shaft with the suppressed sliding abrasion. In addition, the reverse screw section 11 is provided on the intermediate surface 10, and performs a function of sucking the sealed fluid by the pumping effect induced at a time of rotation of the shaft. Thus, the sealed fluid is positively introduced onto the intermediate surface 10 by the pumping effect of the reverse screw section 11, a dynamic pressure is generated on the intermediate surface 10, and the thickness of an oil film increases. Therefore, since a portion having the thick oil film is formed in a wide region, the low torque characteristics based on fluid lubrication is realized. In addition, since the sealed fluid introduced onto the intermediate surface 10 is pushed back by the pumping effect of the screw section 9 provided on the slope 8 at the side opposite to the sealed fluid, the sealed fluid does not leak to the side opposite to the sealed fluid. In order to complete this sealing property, the pumping force of the screw section 9 is set larger than the pumping force of the reverse screw section 11.

As for the oil seal 1 according to the aforementioned example, it can be considered that the configuration thereof is changed and/or added as follows.

Figure 2:
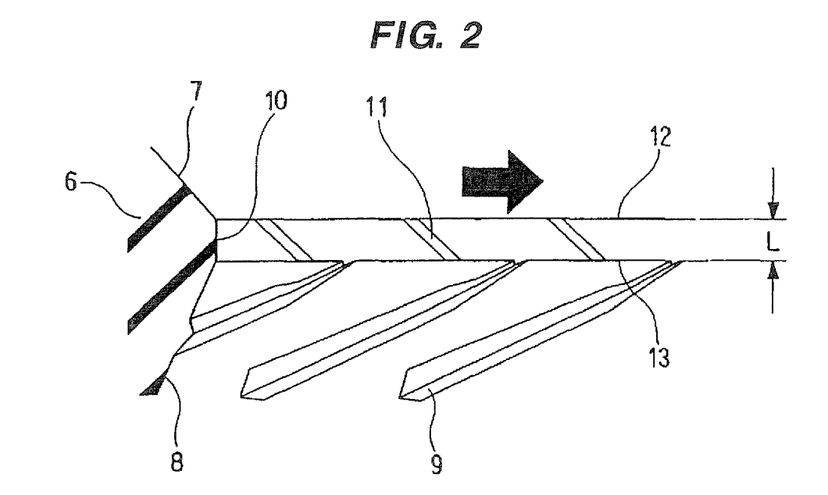
FIG. 2 is a view of main part of the same oil seal.
Figure 3:
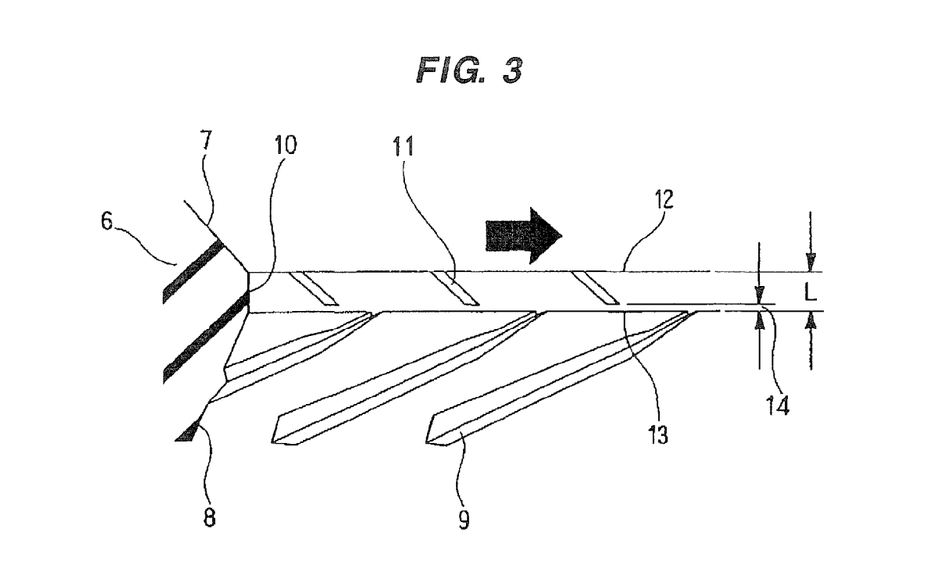
FIG. 3 is a view illustrating main part of an oil seal according to another embodiment of the present invention.

In the aforementioned example, the reverse screw section 11 consists of a plurality of spiral protrusions provided on the circumferential surface, as illustrated in an expanding way in FIG. 2. However, as illustrated in FIG. 3, the reverse screw section 11 can consists of a plurality of spiral grooves (recessions) provided on the circumferential surface instead of the spiral protrusions. The reverse screw section 11 can perform a pumping effect like the case of the protrusions even if the grooves are provided. Further, if the reverse screw section 11 consists of the grooves, the reverse screw section 11 can hold the sealed fluid (oil) in the grooves. Thus, even when supplying of the sealed fluid is a little, the sliding surface can hold lubrication, and the damage of the seal due to abrasion can decrease even at a time of poor lubrication.

Further, in the aforementioned example, the reverse screw section 11 reaches a boundary 13 between the intermediate surface 10 and the slope 8 at the side opposite to the sealed fluid from a boundary 12 between the intermediate surface 10 and the slope 7 at the side of the sealed fluid, as illustrated in an expanding way in FIG. 2. However, instead of such, as illustrated in FIG. 3, the reverse screw section 11 can be provided in such a way that the reverse screw section 11 does not reach the boundary 13 between the intermediate surface 10 and the slope 8 at the side opposite to the sealed fluid, and a belt-like threadless region 14, which lies in the entire circumference between the reverse screw section 11 and the boundary 13 and is in close contact with the circumferential surface of the shaft, is thus provided. When the threadless region 14 lying in the entire circumference is provided in such a configuration, the threadless region 14 performs a function as a seal dam. Thus, so-called static leakage at a time of stopping the rotation of the shaft can be prevented.

Figure 4:
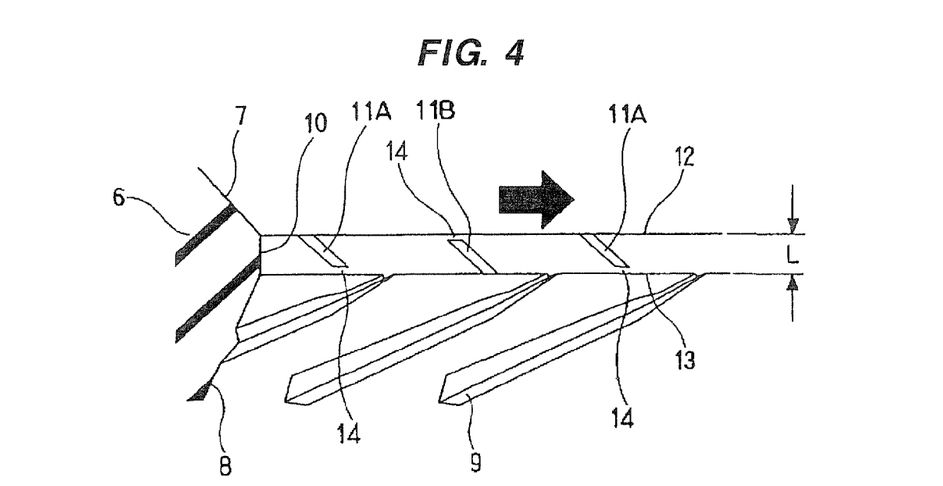
FIG. 4 is a A view illustrating main part of an oil seal according to another embodiment of the present invention.

Furthermore, as illustrated in FIG. 4, a reverse screw section 11A is provided in such a way that the reverse screw section 11A does not reach the boundary 13 between the intermediate surface 10 and the slope 8 at the side opposite to the sealed fluid, a reverse screw section 11B is provided in such a way that the reverse screw section 11B does not reach the boundary 12 between the intermediate surface 10 and the slope 7 at the side of the sealed fluid, and both these reverse screw sections 11A and 11B are provided alternately on the circumferential surface. When the threadless regions 14 are provided alternately on the circumferential surface in this configuration, the oil seal 1 can have both a function for increasing the thickness of the oil film and a function for preventing the static leakage, and can thus have low torque and excellent sealing property. In addition, the former, i.e. the reverse screw section 11A reaches the boundary 12 between the intermediate surface 10 and the slope 7 at the side of the sealed fluid, and the latter, i.e. the reverse screw section 11B reaches the boundary 13 between the intermediate surface 10 and the slope 8 at the side opposite to the sealed fluid.

In addition, the intermediate surface 10 is parallel to a center axis (not illustrated) of the oil seal 1 which is an annular body, or has a smaller sloping angle with respect to the center axis of the oil seal 1 than the sloping angle of the slope 7 at the side of the sealed fluid and the sloping angle of the slope 8 at the side opposite to the sealed fluid. Therefore, there are the following three kinds of embodiments of the intermediate surface 10 in a mounted state (when the shaft is inserted), and the present invention includes all of these embodiments.

Figure 5A:
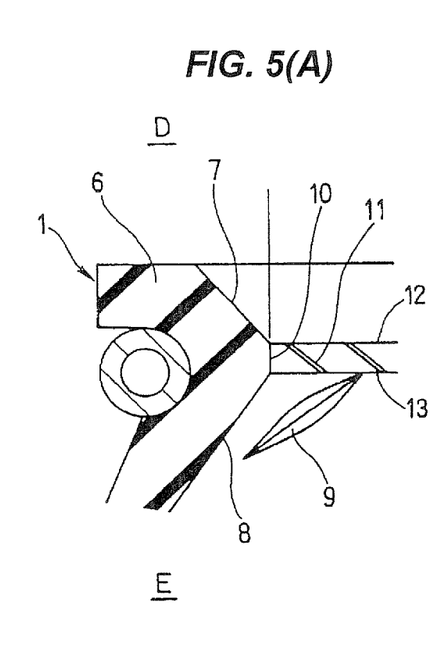
FIGS. 5(A), 5(B) and (C) are views illustrating a sloping angle of an intermediate surface.

(1) A cylindrical intermediate surface parallel to the center shaft of the oil seal 1, as illustrated in FIG. 5 (A).

Figure 5B:
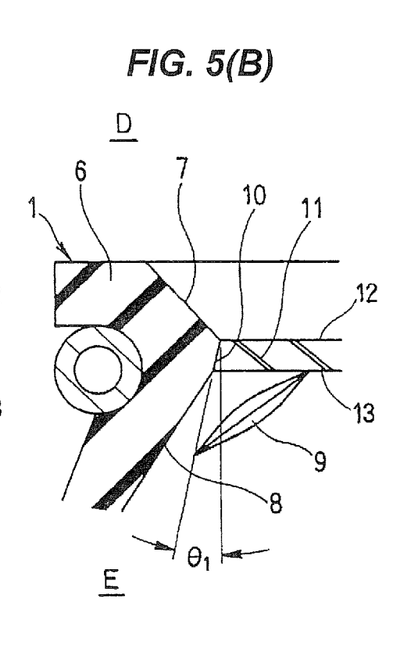

(2) A sloping (conical) intermediate surface having an angle $\theta_1$ at the side E opposite to the sealed fluid (the intermediate surface has an inner diameter size expanding from the side D of the sealed fluid to the side E opposite to the sealed fluid), as illustrated in FIG. 5 (B).

Figure 5C:
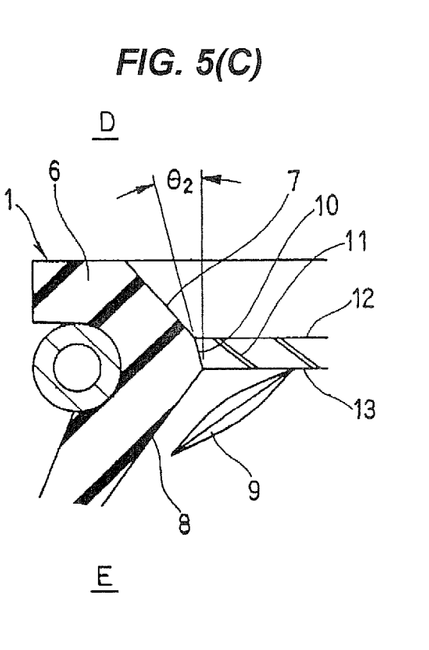

(3) A sloping (conical) intermediate surface having an angle $\theta_2$ at the side D of the sealed fluid (the intermediate surface has an inner diameter size expanding from the side E opposite to the sealed fluid to the side D of the sealed fluid), as illustrated in FIG. 5 (C).

In these cylindrical intermediate surfaces, the intermediate surface in (3) has following effectiveness.

In case of (3), the intermediate surface 10 is a slope surface having the angle $\theta_2$ at the side D of the sealed fluid. Thus, the seal lip 6 slides on a line (the boundary 13) between the slope 8 at the side opposite to the sealed fluid and the intermediate surface 10. On the other hand, the line is a portion where the sealed fluid is gathered most by the pumping effect induced by the screw section 9 provided on the slope 8 at the side opposite to the sealed fluid and the pumping effect induced by the reverse screw section 11 provided on the intermediate surface 10. Therefore, since the seal lip 6 slides on the portion where the sealed fluid is gathered most, the thickness of the oil film of the sliding portion increases more than the thickness of the oil film in case of (1) or (2), and the oil seal 1 can thus have more excellent low torque characteristics.

The magnitude of the sloping angle $\theta_2$ of the intermediate surface 10 to the side D of the sealed fluid in a mounted state is properly within a range of $0<\theta_2\leqq25$ degrees, and more properly $0.1<\theta_2\leqq20$ degrees.

Further, the magnitude of the sloping angle $\theta_1$ of the intermediate surface 10 to the side E opposite to the sealed fluid in a mounted state is properly $0<\theta_1\leqq25$ degrees. The magnitude of the sloping angle of the slope 7 at the side of the sealed fluid is properly 50±10 degrees, and the magnitude of the sloping angle of the slope 8 at the side opposite to the sealed fluid is properly 20±10 degrees.

What is claimed is:

1. An oil seal comprising:
   a seal lip in slidably close contact with a circumferential surface of a mating member;
   a first slope at the side of sealed fluid and a second slope at the side opposite to the sealed fluid, both of which are provided on the seal lip; and
   a first screw section provided on the second slope at the side opposite to the sealed fluid to perform a function of pushing back sealed fluid by a pumping effect induced at a time of rotation, the first screw section being threaded in a first direction,
   wherein an intermediate surface is provided between the first slope and the second slope, and a second screw section for performing a function of sucking the sealed fluid by a pumping effect induced at a time of rotation is provided on the intermediate surface, the second screw section being threaded in a second direction which is opposite to the first direction, and the second screw section provided on the intermediate surface is provided so that the second screw section does not reach a boundary between the intermediate surface and the second slope at the side opposite to the sealed fluid, so that a threadless region is provided on the intermediate surface, the threadless region lying in the entire circumference between the second screw section and the boundary and being in close contact with the circumferential surface of the mating member,
   wherein the intermediate surface has an inner diameter size expanding from the side opposite to the sealed fluid to the side of the sealed fluid so that an entirety of the intermediate surface has an angle $\theta$ at the side of the sealed fluid in a mounted state, and
   wherein the intermediate surface angles differently than the first slope and the second slope.

2. The oil seal as claimed in claim 1, wherein the angle $\theta$ of the intermediate surface to the sealed fluid side in a mounted state is within a range of $0<\theta\leqq25$ degrees.

3. The oil seal as claimed in claim 1, wherein the angle $\theta$ of the intermediate surface to the sealed fluid side in a mounted state is within a range of $0.1<\theta\leqq20$ degrees.

4. An oil seal comprising:
   a seal lip in slidably close contact with a circumferential surface of a mating member;
   a first slope on the lip at a sealed fluid side;
   a second slope on the lip at a side opposite to the sealed fluid side;
   an intermediate surface on the lip between the first slope and the second slope;
   a first screw section on the second slope to push back sealed fluid by a pumping effect induced at a time of rotation, the first screw section being threaded in a first direction; and
   a second screw section on the intermediate surface to suck the sealed fluid by a pumping effect induced at the time of rotation, the second screw section being threaded in a second direction which is opposite to the first direction;
   wherein the intermediate surface includes a threadless region between the second screw section and a boundary between the intermediate surface and the second slope, the threadless region extending continuously around an entire circumference of the intermediate surface and being in close contact with the circumferential surface of the mating member,
   wherein the intermediate surface has an inner diameter size expanding from the side opposite to the sealed fluid side to the sealed fluid side so that an entirety of the intermediate surface has an angle $\theta$ at the sealed fluid side in a mounted state, and
   wherein the intermediate surface angles differently than the first sloe and the second slope.

5. The oil seal as claimed in claim 4, wherein the angle $\theta$ of the intermediate surface to the sealed fluid side in a mounted state is within a range of $0<\theta\leqq25$ degrees.

6. The oil seal as claimed in claim 4, wherein the angle $\theta$ of the intermediate surface to the sealed fluid side in a mounted state is within a range of $0.1<\theta\leqq20$ degrees.

* * * * *

UNITED STATES PATENT AND TRADEMARK OFFICE
CERTIFICATE OF CORRECTION

| | | |
|---|---|---|
| PATENT NO. | : 8,413,995 B2 | Page 1 of 1 |
| APPLICATION NO. | : 12/595417 | |
| DATED | : April 9, 2013 | |
| INVENTOR(S) | : Matsui et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 456 days.

Signed and Sealed this
Eleventh Day of November, 2014

Michelle K. Lee
*Deputy Director of the United States Patent and Trademark Office*